United States Patent Office 3,547,968
Patented Dec. 15, 1970

3,547,968
CATALYTIC HYDROGENATION OF OXIDIZED
ALUMINUM TRIALKYLS
Kaye L. Motz, Ponca City, Okla., assignor to Continental Oil Company, Ponca City, Okla., a corporation of Delaware
No Drawing. Filed Feb. 5, 1968, Ser. No. 702,800
Int. Cl. C07f 5/06; C07c 31/02, 31/32
U.S. Cl. 260—448                                    8 Claims

ABSTRACT OF THE DISCLOSURE

It is disclosed that increased yields of normal alcohols of improved purity can be obtained from Ziegler-type chemistry, e.g., aluminum alkoxides, by hydrogenating the aluminum alkoxide with a hydrogenation catalyst containing nickel or copper prior to hydration.

---

For a number of years now, the high-molecular-weight aliphatic alcohols, e.g., $C_6$ to $C_{30}$ or even higher alcohols, have been growing in commercial importance. For example, the esters of such alcohols are useful as plasticizers in vinyl resins. Such alcohols are useful as intermediates in the production of biodegradable detergents. The alcohols themselves have been used as plasticizers in vinyl resins, as antistatic agents and foam depressants.

In recent years an important source of such alcohols has been from aluminum alkyls. For example, if one starts with a low-molecular-weight aluminum trialkyl or aluminum dialkyl hydride and reacts this material under suitable conditions with a low-molecular-weight olefin, preferably ethylene, one obtains an aluminum trialkyl of high molecular weight. Typically, aluminum triethyl is reacted with ethylene to form aluminum trialkyls with a random distribution of alkyl lengths. By controlling the reaction conditions, one obtains alkyl chains predominately within a desired range, e.g., $C_{10}$ to $C_{16}$, with a small amount of lower and higher chain length present. If one starts with aluminum triethyl and reacts, or grows, this material with ethylene, one obtains alkyl chains with an even number of carbon atoms. On the other hand, if one starts with aluminum tripropyl and again uses ethylene as the olefin, then the alkyl chain will have an odd number of carbon atoms. It is also known that such aluminum alkyls can be converted to alcohols by oxidizing the aluminum alkyl to the alkoxide and recovering the alcohol by hydrolysis. The reactions can be represented simply as follows:

(1) 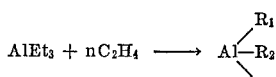

(2) 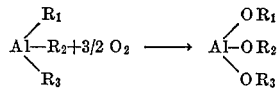

and (3) 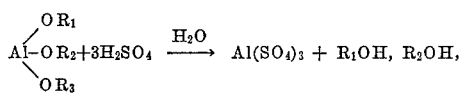

and

$R_3OH$ wherein $AlEt_3$ is aluminum triethyl, $n$ is an integer, $R_1$, $R_2$, and $R_3$ are alkyls, and wherein the sum of the carbon atoms in $R_1+R_2+R_3$ is equal to $n+6$.

Now, all of this is well known in the art and such alcohols are referred to as Ziegler chemistry alcohols, aluminum chemistry alcohols, growth products alcohols, and the like.

In the course of the oxidation of aluminum alkyls a product is formed which upon acid hydrolysis immediately after the completion of the oxidation gives carbonyls, such as aldehydes and dimer hydroxyaldehyde. Higher temperature reduces the oxidation reaction time but adversely affects the formation of these impurities. If the oxidized aluminum alkyl is allowed to stand for some time before hydrolysis, the product observed is largely dimer hydroxyaldehyde. If the oxidized aluminum alkyl is heated prior to hydrolysis, the observed product is the unsaturated dimer alcohol. These reactions are responsible for significant yield loss in commercial operations.

I have now surprisingly found that, if the alkoxide is hydrogenated, the amount of impurities formed can be materially reduced. I have also found that contrary to what one would expect only a limited number of hydrogenation catalysts are operable.

According to this invention, aluminum alkoxides as prepared by growth of low-molecular-weight aluminum alkyls with olefins followed by oxidation is hydrogenated in the presence of copper or nickel catalyst and the hydrogenated product converted to alcohols by hydrolysis.

As has been stated, the materials to be hydrogenated are the oxidized products of aluminum trialkyls. They may be aluminum trialkyls of equal alkyl chain lengths, such as the oxidized product of trihexyl aluminum, tridodecylaluminum, trieicosyl aluminum, and the like, but will in most cases be the oxidized product of aluminum trialkyl having random alkyl chain lengths, e.g., 6 to 30 carbon atoms or more. Generally, the alkyls will be predominantly in the range of 6 to 18 carbon atoms.

The catalysts operable in hydrogenating the growth product are copper and nickel. In my copending application filed on even date herewith and having Ser. No. 702,826, it is shown that hydrogenation catalysts in general will work when promoted with isopropanol. However, in the absence of the promoter, I have found only nickel and copper appear to be effective. In the case of copper, one can start with a reducible copper compound, such as copper chromite, cuprous oxide, cupric oxide, and the like, and by pretreating the copper compound with hydrogen, the copper metal is obtained. With nickel, the nickel metal is required, since similar nickel compounds are not reducible with hydrogen, as is understood by those skilled in the art. The pure metal may be employed, or the metal may be supported on a suitable support, such as kieselguhr, charcoal, zeolite, alumina, and the like. Thus, a soluble copper salt can be utilized to deposit the copper on the support, the support dried and treated with hydrogen to leave the copper on the support. When the metal is supported, the metal ratio to support is most generally in the range of .05/1 to .05/0.1.

As will be understood by those skilled in the art, hydrogenation conditions can vary over a wide range. In general, high pressures permit lower temperatures or residence times, or both. The amount of catalyst used will be that amount which promotes hydrogenation at reasonable rates under reasonable pressure and temperature conditions. The hydrogenation can be carried out either batchwise or continuously. For example, in a batch hydrogenation, as little as 0.1 weight percent catalyst would be operable if sufficient residence time is allowed under usual pressure and temperature conditions. On the other hand, there is no maximum amount of catalyst. However, for economic reasons, one would use only that amount of catalyst required for satisfactory results. The usual range of catalyst used in a batch operation will be 1 to 5 weight percent based on the aluminum trialkoxide.

Since high pressures facilitate hydrogenation and very high pressures require special high cost equipment, the usual pressure range is 100 to 1000 p.s.i.g., preferably 300 to 500 p.s.i.g. With these parameters set, then a temperature in the range of 100 to 250° C., preferably 130 to 200° C., can be used for a residence time of 20 minutes to 1 hour. The same considerations must be given in a continuous operation in which case the same general ranges of temperatures, pressures, and catalysts are utilized and the residence time controlled to assume complete hydrogenation. In both types of operation an excess of hydrogen is used. In both batch and continuous operations, that is, under a superatmospheric hydrogen pressure, the hydrogenation can be conveniently carried out with the alkoxide in a suitable solvent, such as a saturated liquid hydrocarbon.

EXAMPLE 1

A number of runs were made wherein 1 gram of copper chromite catalyst in 5 ml. of tetradecane was treated at 150° C. and 500 p.s.i.g. hydrogen pressure to reduce the catalyst. This material was then added to 80 ml. of recently oxidized growth product and heated at 150° C. for one hour under 500 p.s.i.g. hydrogen, the catalyst was removed by filtration and the alcohol was released by sulphuric acid hydrolysis, as is known in the art. The alcohol was then analyzed for percent impurities, e.g., nonnormal monohydric alcohol.

In the table below, all of the growth product (G.P.) was prepared in the commercial plant. Part of the runs were also oxidized in the plant, part in the pilot plant and part in the laboratory as indicated.

TABLE I

| Run | Sample | Treatment | $\dfrac{\text{Pre } C_{18} \times 100}{C_{18}OH}$ | $\dfrac{\text{Pre } C_{20} \times 100}{C_{20}OH}$ |
| --- | --- | --- | --- | --- |
| 1 | Plant oxidized G.P | Control | 6.25 | 11.5 |
| 2 | do | Treated | 3.65 | 7.7 |
| 3 | Pilot plant oxidized G.P | Control | 7.15 | 14.6 |
| 4 | do | Treated | 4.15 | 8.5 |
| 5 | Lab. oxidized G.P | Control | 12.8 | 25.2 |
| 6 | do | Treated | 4.85 | 7.4 |

From the data in Table I, it can be seen that the hydrogenated oxidized growth product alcohol contained a smaller percentage of impurities than did the control whether the source of the oxidized growth product was from the commercial plant, a pilot plant, or laboratory.

EXAMPLE 2

The run was repeated wherein oxidized tridodecyl aluminum was utilized for obtaining the alcohol. The results are shown in Table II.

TABLE II

| Run | Treatment | Ester | Dimer alcohol | 1,3-br. diol |
| --- | --- | --- | --- | --- |
| 1 | Control | 2.5 | 7.1 | 1.7 |
| 2 | Treated | 0.99 | 3.8 | 0.8 |

The data from Table II shows the effectiveness of the hydrogenation on a pure aluminum trialkyl.

EXAMPLE 3

A series of runs was made on laboratory oxidized growth product using various well known hydrogenation catalysts using the procedure of Example 1. In all cases, the catalyst was preconditioned by subjecting it to hydrogenation conditions prior to contacting the aluminum alkoxy. The alcohol was recovered by hydrolysis and the percent impurity determined. The results are shown in Table III.

TABLE III

| Run | Starting catalyst | Percent impurities |
| --- | --- | --- |
| 1 | Control | 9.6 |
| 2 | Copper chromite | 3.87 |
| 3 | Barium promoted copper chromite | 3.35 |
| 4 | Rh on alumina | 9.95 |
| 5 | Nickel | 3.45 |
| 6 | Platinum | 8.0 |
| 7 | Copper on kieselguhr | 3.62 |
| 8 | 0.5% Ru on alumina | 8.6 |
| 9 | 5% Pt on carbon | 8.0 |
| 10 | Barium promoted copper chromite | 3.6 |
| 11 | Copper on alumina, 15% as CuO | 5.5 |
| 12 | 5% Ru on carbon | 7.0 |
| 13 | Nickel on kieselguhr | 4.0 |
| 14 | Pd and Cr on alumina | 8.5 |
| 15 | Cobalt on alumina | 5.9 |
| 16 | Pd on silica alumina | 9.4 |
| 17 | Ni, Co, Mo on alumina | 9.2 |
| 18 | Pd on $Al_2O_3$ | 9.7 |
| 19 | Copper oxide on zinc oxide | 4.58 |

From Table III it can be seen that only the copper and nickel catalysts were effective.

EXAMPLE 4

Two runs were made wherein laboratory oxidized growth product was hydrogenated in a continuous process in the presence of a copper chromite catalyst at a space velocity of 0.45 g./g./hr. The results were compared with unhydrolyzed portion of the oxidized growth product and are shown in Table IV.

TABLE IV

| | Control | Hydrogenated |
| --- | --- | --- |
| Oxidation temperature | 30 | 30 |
| Oxidation time, minutes | 300 | 300 |
| Percent yield increase | | 6.0 |
| Analysis: | | |
| $\dfrac{\text{Pre 18}}{C_{18}OH} \times 100$ | 10.2 | 3.3 |
| $\dfrac{\text{Pre 20}}{C_{20}OH} \times 100$ | 22.7 | 7.0 |
| $\dfrac{\text{Pre 22}}{C_{22}OH} \times 100$ | 40.6 | 13.9 |

From the above table, it is seen that by reducing impurity formation, there is an increase in alcohol yield.

Having described the invention, I claim:

1. The process for treating aluminum trialkoxide obtained by oxidation of aluminum trialkyls obtained by reacting a low molecular weight aluminum alkyl with a low molecular weight olefin, comprising contacting said aluminum trialkoxide with hydrogen under a pressure of at least 100 p.s.i.g. and a temperature in the range of 100 to 250° C. in the presence of at least 0.1% by weight of a hydrogenation catalyst selected from the group consisting of copper and nickel.

2. The process of claim 1 wherein the hydrogenation catalyst is obtained by prereducing with hydrogen a reducible copper compound selected from the group consisting of copper chromite, barium promoted copper chromite, and copper oxide.

3. The process of claim 1 wherein the catalyst is on a support.

4. The process of claim 3 wherein the catalyst is selected from the group consisting of copper on kieselguhr, copper on alumina, and nickel on kieselguhr.

5. The process of claim 3 wherein the ratio of catalyst to support is in the range of .05/1 to .05/0.1.

6. The process of claim 1 wherein the pressure of said hydrogen is in the range of 300 to 500 p.s.i.g.

7. The process of claim 6 wherein the temperature is in the range of 130 to 200° C.

8. The process of claim 1 wherein said aluminum trialkoxide is the oxidized product of an aluminum trialkyl wherein the alkyl groups have carbon atoms in the range of 6 to 20.

References Cited

UNITED STATES PATENTS

| | | | |
|---|---|---|---|
| 3,270,065 | 8/1966 | Austin | 260—643B |
| 3,394,195 | 7/1968 | Conley et al. | 260—638 |
| 3,450,735 | 6/1969 | Lundeen et al. | 260—448AO |

LEON ZITVER, Primary Examiner

J. E. EVANS, Assistant Examiner

U.S. Cl. X.R.

260—632